March 11, 1941.     H. J. DE N. McCOLLUM     2,234,268
AUTOMOBILE HEATING SYSTEM
Filed April 6, 1938     3 Sheets-Sheet 2
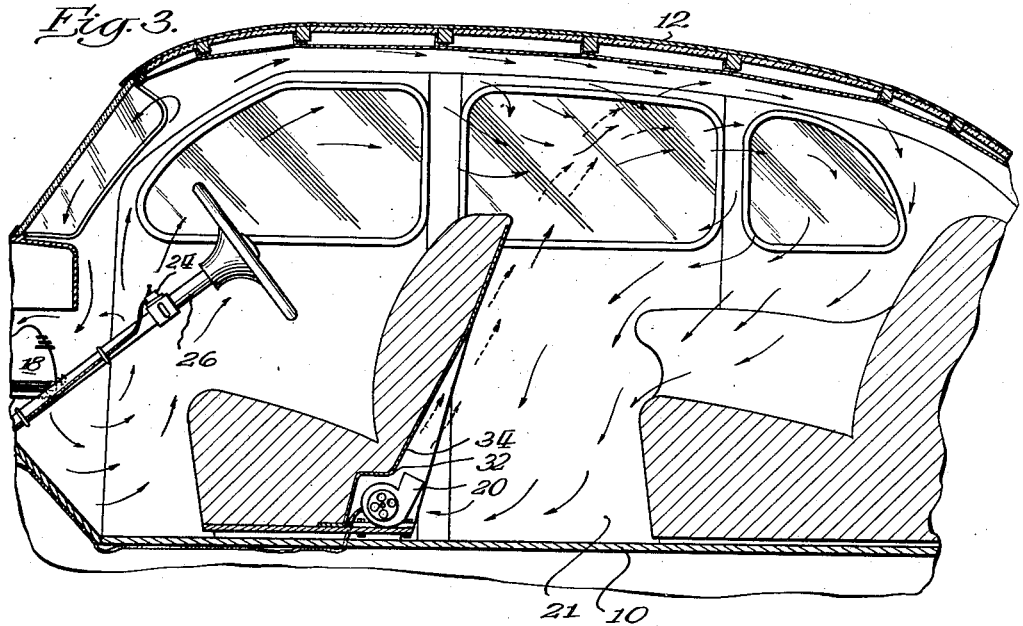
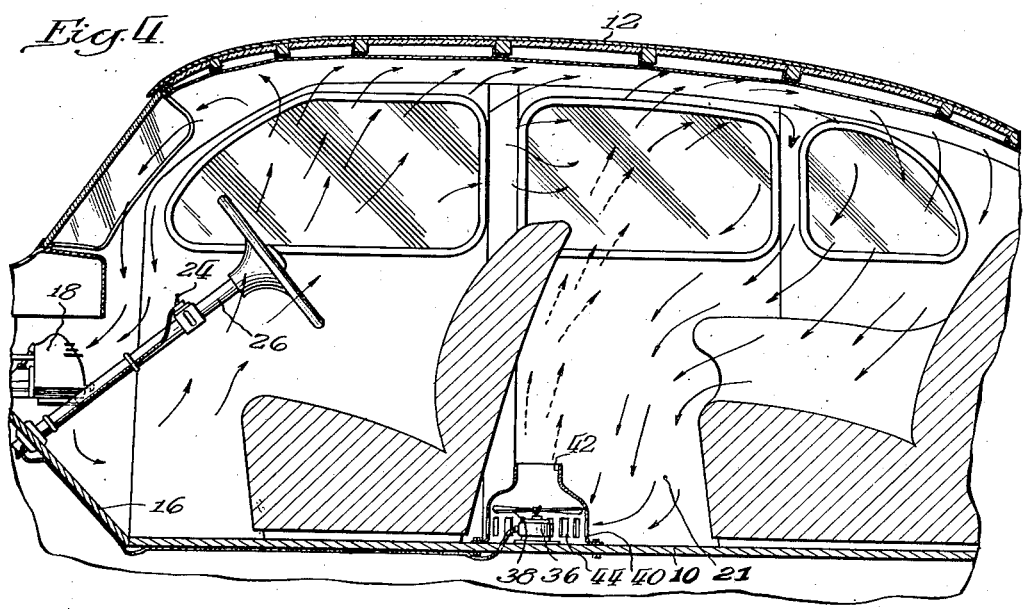
Inventor:
Henry J. DeN McCollum
By Williams, Bradbury & Colert & Hinkle
Attys.

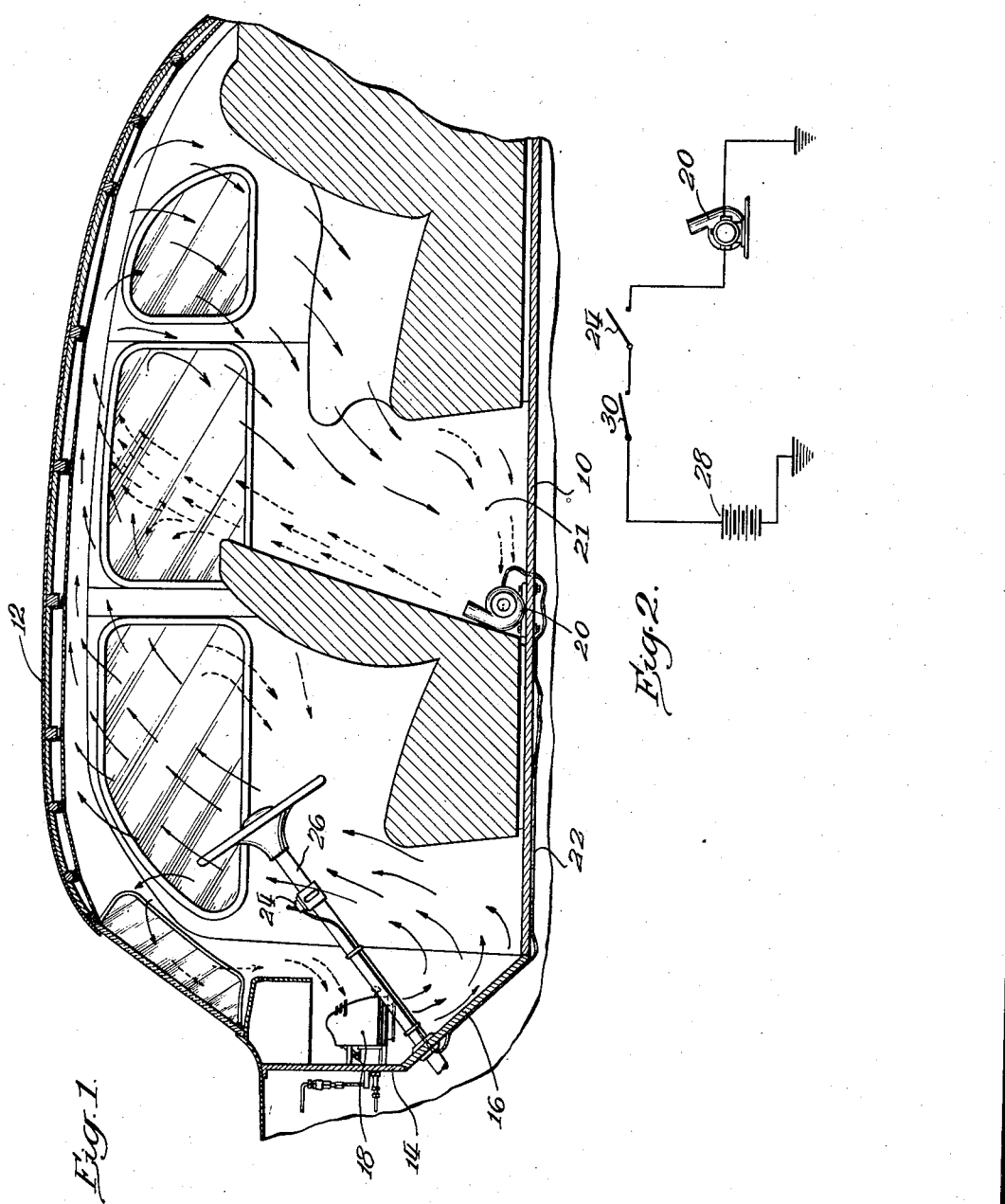

March 11, 1941.                H. J. DE N. McCOLLUM                2,234,268
                              AUTOMOBILE HEATING SYSTEM
                                Filed April 6, 1938              3 Sheets-Sheet 3
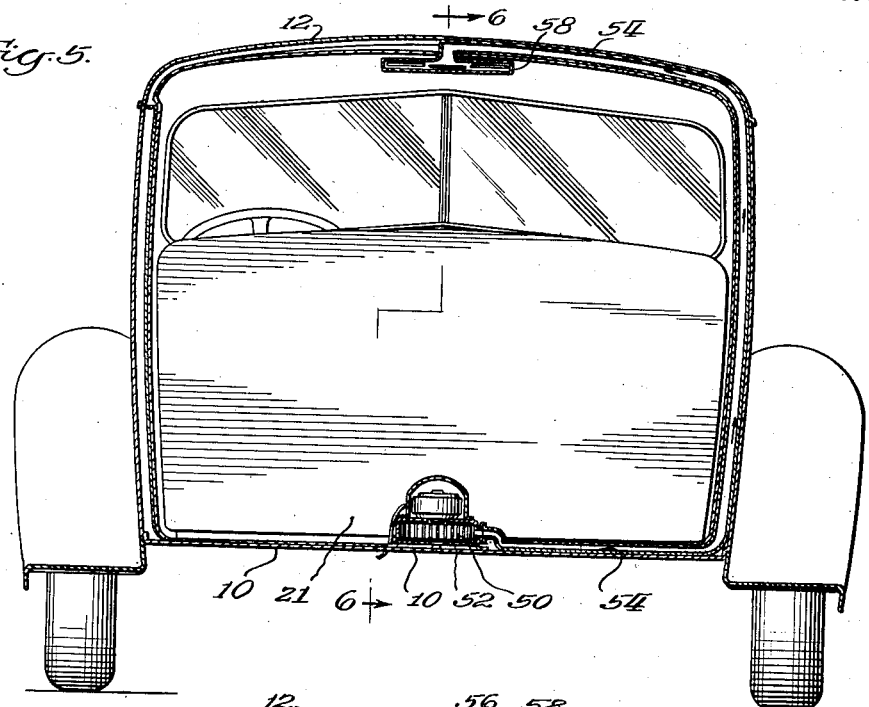
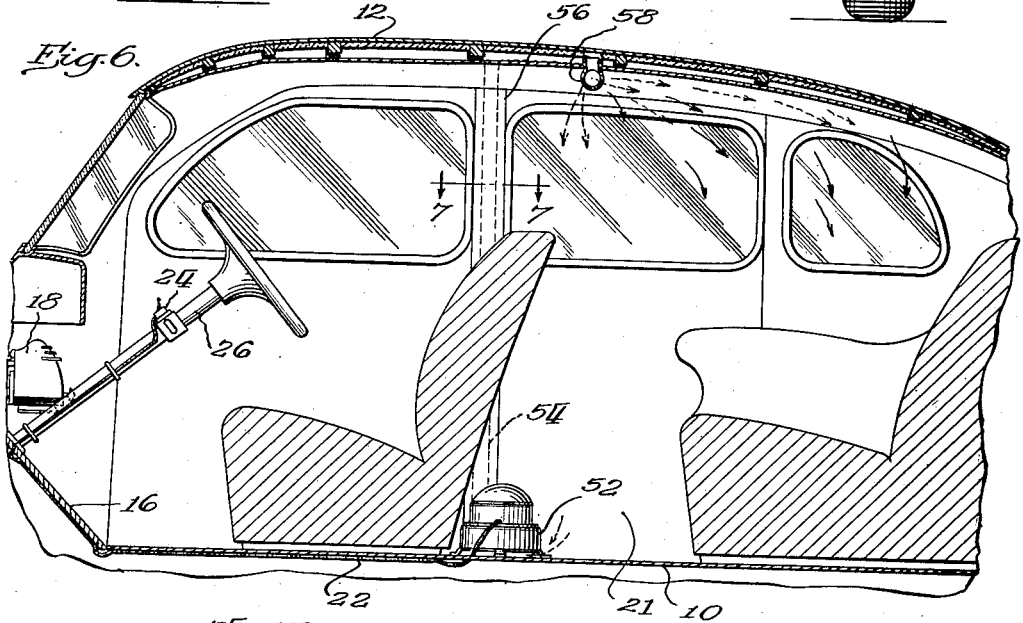
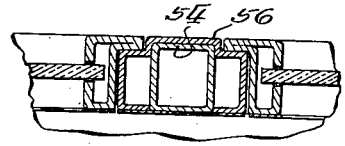
Inventor:
Henry J. DeN. McCollum Patented Mar. 11, 1941

2,234,268

UNITED STATES PATENT OFFICE 2,234,268

AUTOMOBILE HEATING SYSTEM

Henry J. De N. McCollum, Evanston, Ill.

Application April 6, 1938, Serial No. 200,318

5 Claims. (Cl. 237—28)

My invention relates generally to heating systems for automobiles, and more particularly to heating systems for sedans whereby the heat produced by an autombobile heater located in the forward part of the passenger compartment is distributed uniformly throughout the compartment.

Considerable difficulty has been experienced in adequately heating the rear portion of the passenger compartment of a sedan type automobile. In prior endeavors to overcome this difficulty, it has been the practice to provide a second heater for the rear portion of the passenger compartment of the automobile, but even with the use of two heaters in an automobile, it is difficult to maintain the temperature substantially uniform throughout the compartment. Due to convection of the warm air produced by the heater, there is a pronounced tendency for the heated air to collect beneath the top. This tendency toward a pronounced temperature differential between the upper part of the compartment and the space adjacent the floor below is aggravated by the fact that the floor is usually less well insulated than the top. The comfort of the passengers is dependent primarily upon the temperature of the air adjacent the floor, since, if the passenger's feet are maintained comfortably warm, he will justifiably consider the automobile to be adequately heated.

With the present types of heater installations in automobiles, the passenger's head is in a region of high temperature, while his feet are in a much cooler region. The temperature differential between the space adjacent the floor and that adjacent the top of the passenger compartment may be as much as 20° F. or 30° F. This differential of temperature in the rear portion of the sedan type automobile is greater than that in the portion in front of the front seat because in many automobile heaters the heater is provided with a fan which forces the air downwardly toward the floor. If the heater is of the type in which the heated air is forced horizontally by the fan, there may be a very decided temperature differential between the region adjacent the top and the region adjacent the floor in front of the front seat of the vehicle, as well as in the space behind the front seat.

In accordance with my invention, I provide a means for withdrawing the cold air in the region adjacent the floor behind the front seat, and forcing this cold air upwardly, displacing the heated air adjacent the top of the compartment so as to cause circulation of the air in directions opposite to the normal convection currents. By this method, the heated air is forced downwardly into the space between the front and rear seats, and the passengers seated in the rear seat are thus made more comfortable. To raise the temperature of the space between the front and rear seats near the floor to the same temperature as the top is practically impossible when using a customary automobile heating system, because even if an extremely effective heater were used, it would raise the temperature of the space adjacent the top of the vehicle to such high temperature as to make the passengers uncomfortable before the temperature adjacent the floor was raised appreciably. By maintaining the temperature more uniform throughout the whole compartment, I have discovered that it is not necessary to supply as much heat as would otherwise be necessary. This is due not only to the fact that the temperature required for comfort is lowered if the temperature is uniformly maintained throughout the compartment, but also because of the fact that when some portions of the compartment are at much higher temperature than others, the rate at which heat is conducted and radiated from the compartment is greater. This arises from the fact that the rate of dissipation of heat from a hotter body to a colder body varies as a power function of the temperature difference between the bodies, and not as a direct proportion.

It is thus a primary object of my invention to provide an improved heating system for automotive vehicles in which the temperature is maintained substantially uniformly throughout the passenger compartment.

A further object is to provide an improved heating system for sedan type vehicles in which an improved method for heating the space between the front and rear seats is provided.

Other objects will appear from the following description, reference being had to the accompanying drawings, in which:

Fig. 1 is a longitudinal sectional view of a passenger compartment of a vehicle showing one form of the apparatus provided for carrying out my improved method of heating;

Fig. 2 is a circuit diagram showing the connections for supplying the blower with electrical power.

Fig. 3 is a view similar to Fig. 1 showing a modified form of apparatus, wherein the blower is arranged for factory installation;

Fig. 4 is a view similar to Fig. 1 showing a modified form of blower installation;

Fig. 5 is a transverse sectional view of an automobile taken just behind the front seat thereof;

Fig. 6 is a longitudinal sectional view taken on the line 6—6 of Fig. 5; and

Fig. 7 is a fragmentary sectional view taken on the line 7—7 of Fig. 6.

The portion of an automobile shown in Fig. 1 comprises a floor 10 usually of metal, a metal top 12, and a dash 14, 16. The compartment is supplied with heat by a heater 18 secured to the dash 14. This heater may be of any well known type, but is preferably one in which the heated air is forced downwardly from the heater, as shown in my copending application Serial No. 61,213, filed January 28, 1936. The approximate directions of the currents of heated air from the heater are indicated by full line arrows, and show that although the heated air is initially directed downwardly by the heater fan, it rapidly rises and tends to collect directly beneath the top of the vehicle. Air is of course cooled as it comes in contact with the side walls and windows, and such cooled currents of air are indicated by the dotted line arrows. A complete diagram of the air currents cannot feasibly be indicated in Fig. 1 because the currents along the side walls will be in a different direction than the air currents nearer the center of the compartment. Generally, however, the heated air will flow upwardly as indicated in Fig. 1 in the central portion of the compartment and flow downwardly after being in contact with the side walls and being cooled, and thus return to the heater for reheating and recirculation thereby.

In accordance with the method of my invention, I provide a blower 20 just behind the back of the front seat having its discharge nozzle directed upwardly along the back of the front seat so that the current of air produced thereby will not be directed against the bodies of the persons seated in the rear seat. The blower 20 is preferably electric motor operated and is illustrated in Fig. 1 as being supplied with current through a conductor 22 connected to a suitable switch 24 mounted on the steering column 26. If desired, the connection for supplying the blower motor with electric power may be as shown in Fig. 2, wherein current from the battery 28 is supplied to ignition switch 30 and thence through the switch 24 to one terminal of the motor for the blower 20, the other terminal of the motor being grounded in the usual manner.

The blower 20 is effective to withdraw the cold air which tends to collect in the space 21 adjacent the floor between the front and rear seats, and to eject this cold air upwardly as indicated by the dotted arrows. This relatively cool air is thus directed against the top of the compartment, where it is mixed with the warmer air derived from the heater. As a result, the warmer air which would otherwise tend to collect beneath the top of the compartment is forced downwardly as indicated by the full line arrows, and the space between the front and rear seats is rendered substantially uniform in temperature. The passengers in the rear seat may thus be made as comfortable as those in the front seat, without the necessity of providing an additional heater.

In the modified form of my invention shown in Fig. 3, the blower 20 is located in a recess 32 formed in the front seat, the blower being secured to the base of the seat assembly so as to be movable with the seat when the position of the latter is adjusted. A tapering groove 34 may be provided in the rear surface of the back of the front seat to form a channel for the cold air discharged from the blower 20. If desired, this groove or channel 34 may be closed to form a conduit extending to the upper edge of the back of the front seat, although ordinarily such construction will be unnecessary if the air discharged from the blower is ejected at sufficiently high velocity to maintain its cohesion as a separate stream of air. In other respects, the construction and operation of the structure shown in Fig. 3 is identical with that shown in Fig. 1, and similar reference characters have therefore been applied to corresponding parts.

In Fig. 4, I have shown a modified construction in which an electric motor 36 is mounted upon the floor between the front and rear seats and drives a fan 38. The motor and the fan are enclosed in a housing 40 which may be of any suitable decorative contour and which is provided with a stream directing outlet nozzle 42. The casing 40 is provided with a plurality of inlet openings 44 located close to the floor 10 so that the cold air which otherwise tends to collect adjacent the floor will be drawn into the housing and ejected upwardly at relatively high velocity, as indicated by the dotted line arrows in Fig. 4. While the motor driven fan 38 need not eject the air at such high velocity as does the blower 20, the velocity of the air should be sufficient that the air will flow in a definite stream until it reaches substantially the top of the vehicle. In this way, the cold air will be effective to displace the warmer air which tends to collect immediately beneath the top of the vehicle and cause the latter to flow downwardly, and therefore to convey heat to the space 21. As a result, the temperature of the air in the space 21 will be equalized with that of the remaining air in the compartment, and the passengers seated in the rear seat will be made comfortable.

In Figs. 5, 6, and 7 I have shown a further modification of my invention in which a blower 45 is utilized to draw air from the space 21 adjacent the floor and eject it through a conduit to a point beneath the top of the vehicle. The blower is illustrated as comprising a rotor 50 mounted in a housing 52 which is secured to the floor 10 of the vehicle. The cold air is drawn from the space between the floor 10 and the rotor housing 52 and is ejected through a conduit 54 which extends sidewardly to the side edge of the floor and upwardly through the column 56. The conduit 54 then extends toward the center of the vehicle between the top and fabric lining therefor and terminates in a diffuser 58 located substantially at the center of the vehicle. The cold air drawn into the blower is thus ejected through the conduit 54 and dispersed near the top of the vehicle so as to displace the hot air which would otherwise tend to accumulate at this point. In installations of this character, the blower need not be located above the floor 10, but with substantially equal convenience may be located beneath the floor 10 in a sealed enclosure. In this way, the blower would not restrict the foot room for the passengers seated in the rear seat.

The means for circulating the air, that is the blower, or the fan, should have adequate volumetric capacity to insure fairly rapid recirculation of the air in the passenger compartment, but should not be so great as to cause noticeable objectional drafts. Ordinarily, a blower having a volumetric capacity of 100 cubic feet per minute will be found satisfactory. In a typical installation of the character disclosed herein, particularly the arrangement shown in Fig. 1, I have found that with an outside temperature of 34° F. ten minutes after the heater was started (without starting the blower 20), temperature near the top of the passenger compartment rose to 71°, whereas, that at the floor was raised only to 56°. With the air about the heads of the occupants of the vehicle at 71° F., the occupants felt uncomfortably warm, and breathing became uncomfortable, while their feet were cold. Thereafter, the switch 24 was closed to initiate the operation of the blower 20, whereupon, after about five minutes of operation under these conditions, the temperature at the top of the compartment was raised to 79°, and the temperature adjacent the floor was raised to 78°. After operation for some time under these conditions, the switch 24 was opened and after a few minutes, the temperature at the top of the compartment rose to 88°, whereas, the temperature adjacent the floor dropped to 56°. Repetition of these tests indicated that without operating the blower 20, there is an average difference of approximately 23° between the top and floor of the passenger compartment, and under these conditions, the air beneath the top becomes stifling so as to make it undesirable to supply additional heat in an endeavor to raise the temperature of the air adjacent the floor. When the blower 20 is in operation, the average difference between the temperature of the roof and that of the floor of the compartment is 7°, and under these conditions even though the temperature of the air at the top is higher than when the blower is not in operation, there is no stifling effect, undoubtedly due to the fact that the air at the top of the compartment is not stagnant, but is continually circulating about the heads of the passengers.

From a consideration of various modifications of my invention disclosed herein, it will be apparent to those skilled in the art that numerous other modifications and variations of the invention may be made without departing from the underlying principles of my invention. I therefore desire to include within the scope of the following claims all such similar methods and such similar constructions whereby substantially the same results may be obtained by substantially the same means.

I claim:

1. The method of heating the passenger compartment of a sedan type automobile which comprises heating air drawn from the forward end of said compartment and discharging the heated air downwardly, permitting heated air to flow to the top of the vehicle by convection and displacing said heated air from the space adjacent the top of the vehicle by directing thereto and admixing therewith relatively cooler air drawn from the space between the front and rear seats of the vehicle adjacent the floor thereof.

2. The method of heating a closed passenger vehicle compartment provided with a transverse substantially vertical wall which interferes materially with the free circulation of air between the two portions of the compartment which comprises, heating the air in one portion of said compartment and permitting heated air to flow by convection toward the second portion of the said compartment into the space adjacent the top of said compartment, drawing relatively cool air from the space adjacent the bottom of said second portion of said compartment, and ejecting the air thus withdrawn upwardly in a forceful stream so as to cause said air to admix with and displace the warm air supplied by said heater.

3. In a system for heating the passenger compartment of a sedan type automobile having backs for the front seats which substantially obstruct free circulation of air along the lower portion of the compartment comprising, a heater located in the portion of the compartment forwardly of the front seat and supplying heat sufficient to raise all of the air in said compartment to a comfortable temperature, a conduit having an inlet positioned adjacent the floor of the vehicle at a point between the back of the front seat and the rear seat and having an outlet adjacent the top of the compartment, and means for causing circulation of air through said conduit.

4. The combination set forth in claim 3 in which said conduit is formed between the inner and outer walls of a portion of the vehicle body.

5. The combination set forth in claim 3 in which the outlet of said conduit is formed to direct most of the air discharged therefrom rearwardly along the top of the compartment.

HENRY J. De N. McCOLLUM.